(12) United States Patent
Cho et al.

(10) Patent No.: US 9,915,569 B2
(45) Date of Patent: Mar. 13, 2018

(54) APPARATUS FOR SENSING TEMPERATURE USING SENSOR RESISTOR AND METHOD THEREOF

(71) Applicant: KOREA ADVANCED INSTITUTE OF SCIENCE AND TECHNOLOGY, Daejeon (KR)

(72) Inventors: Seong Hwan Cho, Daejeon (KR); Sung Rok Jeon, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 325 days.

(21) Appl. No.: 14/733,527

(22) Filed: Jun. 8, 2015

(65) Prior Publication Data

US 2015/0355034 A1 Dec. 10, 2015

(30) Foreign Application Priority Data

Jun. 9, 2014 (KR) ........................ 10-2014-0069269

(51) Int. Cl.
| | |
|---|---|
| *G01K 7/16* | (2006.01) |
| *G01K 7/18* | (2006.01) |
| *G01K 3/04* | (2006.01) |
| *G01K 15/00* | (2006.01) |

(52) U.S. Cl.
CPC ............ *G01K 7/18* (2013.01); *G01K 15/005* (2013.01); *G01K 2219/00* (2013.01)

(58) Field of Classification Search
CPC .. G01K 7/00; G01K 7/16; G01K 7/25; G01K 7/34; G01K 7/18; G01K 3/04
See application file for complete search history.

(56) References Cited

U.S. PATENT DOCUMENTS

| | | | | |
|---|---|---|---|---|
| 4,050,309 A | * | 9/1977 | Junkert | G01K 7/20 374/171 |
| 4,065,715 A | * | 12/1977 | Jaffe | G01D 5/24 324/609 |
| 4,206,648 A | * | 6/1980 | Tuska | G01D 3/024 331/66 |
| 4,703,886 A | * | 11/1987 | Kirby | G05D 23/1902 165/222 |

(Continued)

FOREIGN PATENT DOCUMENTS

| | | | | |
|---|---|---|---|---|
| JP | H07-140014 A | 6/1995 | | |
| JP | 5383610 B2 | * | 1/2014 | ......... H03M 1/1215 |
| WO | WO 2011037292 A1 | * | 3/2011 | ............. H03M 1/50 |

*Primary Examiner* — Gail Kaplan Verbitsky
(74) *Attorney, Agent, or Firm* — Sang Ho Lee; Novick, Kim & Lee, PLLC

(57) ABSTRACT

Provided herein is an apparatus for sensing temperature. The apparatus for sensing temperature includes: a sensor unit configured to include at least one sensor resistor and output a sensing signal varying by the sensor resistor in response to temperature when the sensor unit is applied with an operating voltage; a data conversion unit configured to convert a change in temperature sensed based on the sensing signal output from the sensor unit into a time signal and generate temperature information based on the converted time signal; and a control unit configured to control the sensor unit and the data conversion unit and output a temperature value determined depending on the temperature information.

13 Claims, 11 Drawing Sheets

(56) References Cited

U.S. PATENT DOCUMENTS

| | | | | |
|---|---|---|---|---|
| 4,838,707 A * | 6/1989 | Ozawa | G01K 1/028 | 374/170 |
| 4,910,689 A * | 3/1990 | Shibamiya | G01R 27/02 | 374/E7.031 |
| 5,469,071 A * | 11/1995 | Obata | G01R 17/105 | 324/691 |
| 5,657,238 A * | 8/1997 | Lindeboom | G01K 7/24 | 324/677 |
| 6,320,512 B1 * | 11/2001 | Nicholson | G01K 1/024 | 340/521 |
| 6,957,910 B1 * | 10/2005 | Wan | G01K 7/01 | 327/512 |
| 8,669,810 B2 * | 3/2014 | Kwon | G04F 10/005 | 330/252 |
| 8,890,741 B2 * | 11/2014 | Dosho | H03M 1/50 | 341/155 |
| 8,933,831 B2 * | 1/2015 | Oshima | H03M 1/0836 | 341/118 |
| 2002/0094010 A1 * | 7/2002 | Vail | H01Q 1/02 | 374/183 |
| 2002/0105436 A1 * | 8/2002 | Bell | G01K 7/245 | 340/870.17 |
| 2011/0098966 A1 * | 4/2011 | Suzuki | G01K 7/24 | 702/133 |
| 2012/0226460 A1 * | 9/2012 | Fiennes | G01K 15/00 | 702/99 |
| 2013/0249627 A1 * | 9/2013 | Kwon | H03K 5/1515 | 330/69 |
| 2015/0110157 A1 * | 4/2015 | Chen | G01K 7/346 | 374/170 |
| 2016/0359463 A1 * | 12/2016 | Kurose | H03M 1/50 | |

\* cited by examiner

APPARATUS FOR SENSING TEMPERATURE USING SENSOR RESISTOR AND METHOD THEREOF

BACKGROUND OF THE INVENTION

Field of the Invention

The present invention relates to an apparatus for sensing temperature using a sensor resistor and a method thereof, and more particularly, to an apparatus for sensing temperature using a sensor resistor and a method thereof using a change in a temperature value in response to the temperature of the sensor resistor.

Description of the Related Art

Generally, to keep up with high performance of electronic systems such as a personal computer and electronic communication devices, the speed and integration of a volatile semiconductor memory apparatus such as a dynamic random access memory (DRAM) equipped as a memory have also been increased day by day. In the case of the semiconductor memory apparatus equipped in systems like a mobile phone, a notebook computer, etc., which are operated as a battery, in particular, low power consumption characteristics are acutely required and therefore efforts and researches to reduce an operating current and a standby current have been actively conducted.

Characteristics of data retention of a DRAM memory cell configured of one transistor and one storage capacitor are very sensitive to temperature. Therefore, there may be a need to control operating conditions of circuit block in a semiconductor integrated circuit in response to a change in ambient temperature. For example, in the case of the DRAM used in mobile products, a refresh period is controlled in response to the change in ambient temperature.

To control the operating conditions in response to the change in ambient temperature, temperature sensors like a digital temp sensor regulator (DTSR), an analog temp sensor regulator (ATSR), etc., are generally used. These temperature sensor serves to sense high temperature, controls an operating period to reduce current consumption in a self refresh mode, monitor the ambient temperature in a normal operation, etc.

However, there is a problem in that the overall size of a chip is increased due to an area occupied by one temperature sensor during a process of manufacturing a semiconductor chip. Further, power consumed by the temperature sensor itself may not be disregarded. In particular, when the chip area is increased, the above-mentioned problem may be sharply increased.

SUMMARY OF THE INVENTION

Technical Problem

The present invention is made in an effort to resolve the above-mentioned problems. Accordingly, an object of the present invention is to provide an apparatus for sensing temperature using a sensor resistor and a method thereof capable of reducing an area occupied by one temperature sensor.

Another object of the present invention is to provide an apparatus for sensing temperature using a sensor resistor and a method thereof capable of reducing power consumed by a temperature sensor itself using a linear sensor resistor and having a low temperature error.

Still another object of the present invention is to an apparatus for sensing temperature, a method for sensing temperature, and a calibration method thereof capable of shortening a calibration process of temperature resistance.

Solution to Problem

To achieve the above objects, an apparatus for sensing temperature according to an embodiment of the present invention includes: a sensor unit configured to include at least one sensor resistor and output a sensing signal varying by the sensor resistor in response to temperature when the sensor unit is applied with an operating voltage; a data conversion unit configured to convert a change in temperature sensed based on the sensing signal output from the sensor unit into a time signal and generate temperature information based on the converted time signal; and a control unit configured to control the sensor unit and the data conversion unit and output a temperature value determined depending on the temperature information.

To achieve the above objects, a method for sensing temperature according to another embodiment of the present invention includes: outputting, a sensing signal variably sensed by at least one sensor resistor in response to temperature from the sensor resistor, when the sensor resistor is applied with an operating voltage; converting a change in temperature sensed based on the sensing signal into a time signal and generating temperature information based on the time signal; and outputting a temperature value determined depending on the temperature information.

To achieve the above objects, a computer readable recording mediums still another embodiment of the present invention is recorded with programs for allowing a computer to execute the method.

Advantageous Effect

According to the embodiments of the present invention, it is possible to reduce the area occupied by one temperature sensor by not using the transistor like the existing temperature sensor.

Further, according to the embodiments of the present invention, it is possible to provide the apparatus for sensing temperature and the method for sensing temperature capable of reducing power consumed by the temperature sensor itself using the linear sensor resistor and having the low temperature error.

In addition according to the embodiments of the present invention, it is possible to reduce the calibration process of the temperature resistor.

DETAILED DESCRIPTION OF THE PREFERRED EMBODIMENT

Figure 1:
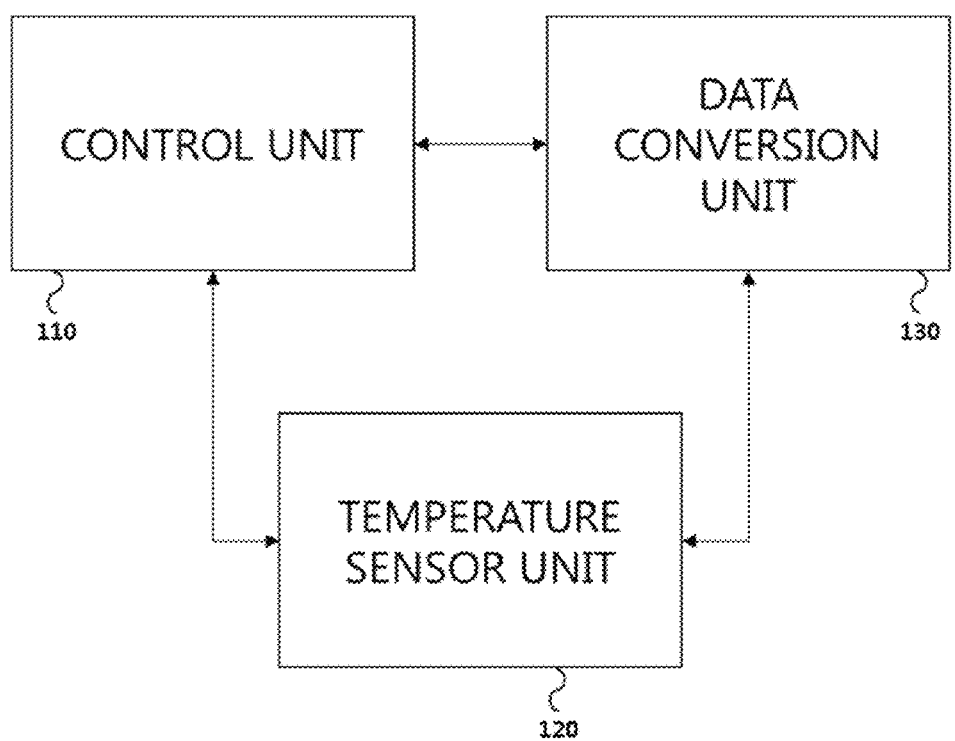
FIG. 1 is a view schematically depicting an apparatus for sensing temperature according to an embodiment of the present invention.

The descriptions hereinafter propose the principles of the invention, so it is obvious that a person having ordinary skill in the art can implement the principle of the invention even though it is not described or depicted in the present specification and can invent various apparatuses included in the concept and scope of the invention. In addition, it should be understood that the conditional terms and embodiments listed in the present invention are principally intended to help the concepts of the present invention to be fully understood, not limiting the listed embodiments and states.

In addition, it should be understood that all the detailed descriptions listing the principle, view point and embodiments as well as specific embodiments of the present invention are intended to include the structural and functional equivalents of these matters. In addition, it should be understood that these equivalent matters include all the devices invented to perform the same functions irrespective of the currently known equivalent matters as well as the equivalent matters, namely, structures which will be developed in the future.

Therefore, for example, it should be understood that the block diagrams of the present specification are intended to show the conception view points of the exemplary circuits which embody the principles of the present invention. In similar ways, all the flows, state conversion views, pseudo codes, etc. may be substantially expressed on a computer readable medium and may represent various processes which can be executed by a computer or a processor irrespective of whether the computer or the processor is clearly depicted or not.

The functions of various element depicted in the drawings and including the processor or the functional blocks indicates in the form of similar concepts may be executed using an exclusive hardware as well as the hardware which has abilities to execute the related software. When it is provided by the processor, the above functions may provided by a single exclusive processor, a single shared processor or a plurality of individual processors, and a part of them may be shared.

The correct use of the processor or the term which is suggested as a concept similar therewith should not be interpreted in such a way to exclusively cite the hardware which has an ability to execute software, and it should be interpreted that it is indented to implicitly include ROM, RAM and a nonvolatile memory. Well known other hardware may be included.

In the claims of the present specification, the components expressed as a method for executing the functions recited in the detailed descriptions are intended to include all the methods for executing the functions which include all types of software including a combination of circuit elements performing, for example, the above functions or a firmware/micro code, etc. and may be combined with an appropriate circuit to execute the software. It should be understood that the present invention defined by such claims is combined with the functions provided by variously listed means and with the ways that the claims require, so any means for providing the above functions should be understood to be equivalent to what can be recognized from the present specification.

The above-described objects, features and advantages could become clear with the aid of the following descriptions in relation with the accompanying drawings, and a person having ordinary skill in the art to which the present invention pertains can easily implement the technical concepts of the present invention. In addition, while the present invention is being described, if it is judged that the descriptions with respect to the known technology in relation with the present invention may make unclear the subject matters of the present invention, such detailed descriptions would be omitted.

FIG. 1 is a view schematically depicting an apparatus for sensing temperature according to an embodiment of the present invention.

Referring to FIG. 1, an apparatus 100 for sensing temperature according to an embodiment of the present invention includes a control unit 110, a temperature sensor unit 120, and a data conversion unit 130.

The temperature sensor unit 120 includes at least one sensor resistor and when being applied with an operating voltage, the temperature sensor unit 120 outputs a sensing signal varying by the sensor resistor in response to temperature.

Further, the data conversion unit 130 converts a change temperature sensed based on the sensing signal output from the sensor unit 120 into a time signal and generates temperature information based on the converted time signal.

Meanwhile, the control unit 110 controls the sensor unit and the data conversion unit and outputs a temperature value determined based on the temperature information.

In more detail, the temperature sensor unit 120 may include: a sensor resistor unit 121 which includes the sensor resistor and outputs a first signal in response to a selection signal applied to the sensor resistor; and a dummy resistor 122 which outputs a second signal in response to the selection signal applied to the sensor resistor, separately from the sensor resistor.

The dummy resistor unit 122 may have a circuit connection structure in which only the sensor resistor is omitted from the circuit connection structure of the sensor resistor unit, in which the second signal output from the dummy resistor 122 may include a signal component formed by a linear resistor included in the dummy resistor.

Further, the data conversion unit 130 may generate the temperature information based on a difference between first time information acquired from the first signal and second time information acquired from the second signal.

To this end, the data conversion unit 130 may include a first voltage-time converter 131 for acquiring the first time information, a second voltage-time converter 132 for acquiring the second time information, and a time difference calculator 133 for calculating the time difference based on an output form the first voltage-time converter and an output from the second voltage-time converter.

Meanwhile, the control unit 110 may generate a temperature information table for determining the temperature value depending on the output from the data conversion unit and store the generated temperature information table. To this end, a calibration process may be performed, which will be described below.

Meanwhile, the temperature sensor unit 120 according to the embodiment of the present invention may charge electric charges in a first capacitor connected to the sensor resistor when it is applied with a selection voltage of the control unit and output a first voltage for the first time which is from the timing when the first selection signal is released to timing when electric charges are discharged from the first capacitor. Further, the temperature sensor unit 120 according to the embodiment of the present invention may charge electric charges in a second capacitor connected to the sensor resistor when it is applied with the selection voltage of the control unit and output a second voltage for the second time which is from the timing when the selection signal is released to timing when electric charges are discharged from the second capacitor.

In this case, the data conversion unit 130 may generate the temperature information based on the difference between an output time of the first voltage and an output time of the second voltage.

Figure 2:
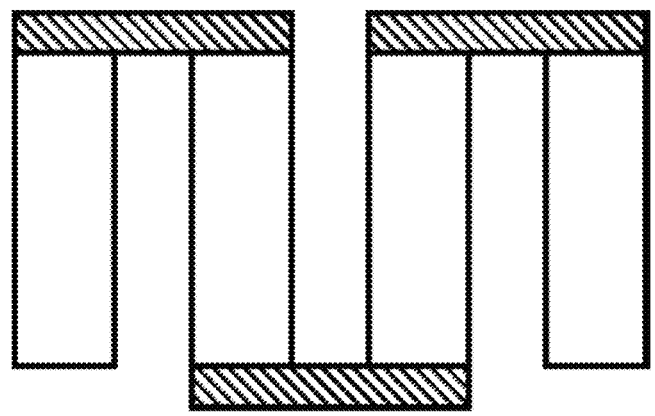
FIGS. 2 and 3 are views depicting a temperature sensor structure of the apparatus for sensing temperature according to the embodiment of the present invention.
Figure 3:
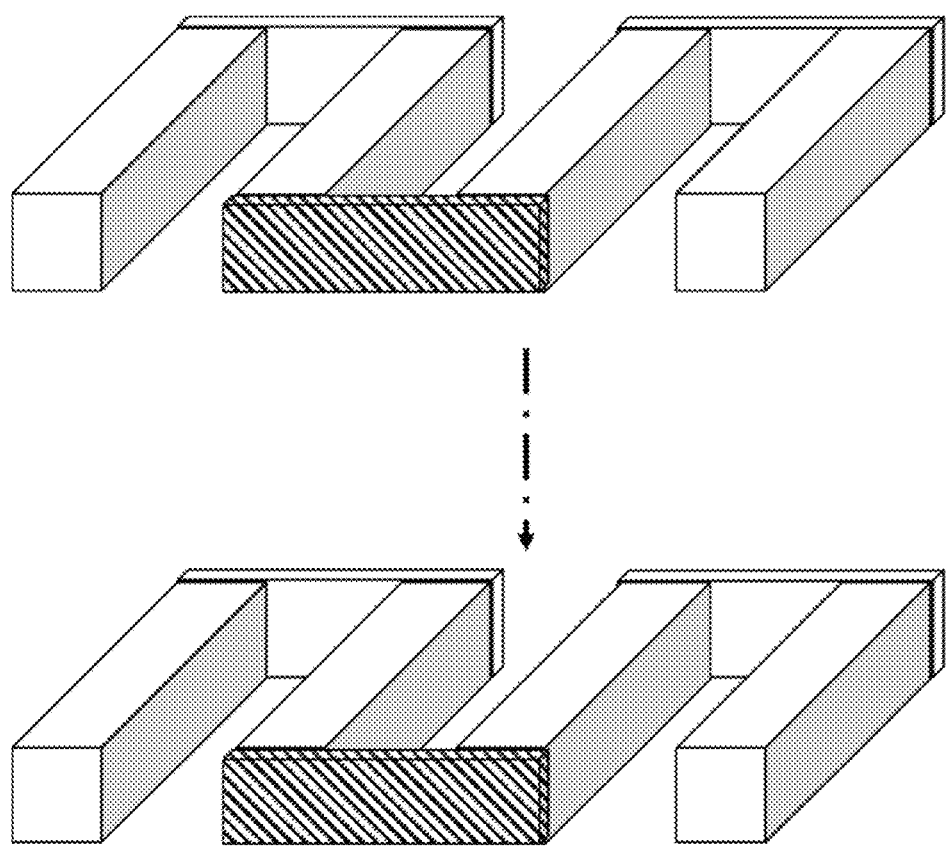

FIGS. 2 and 3 are views depicting a temperature sensor structure of the apparatus for sensing temperature according to the embodiment of the present invention.

The temperature sensor unit 120 according to the embodiment of the present invention may include at least one sensor resistor for sensing temperature. The sensor resistor may be configured of only a pure resistor. In particular, as the sensor resistor, a resistor provided during a process of manufacturing a semiconductor chip may be used. There may be various kinds of resistors, but the resistor of the temperature sensor unit 120 according to the embodiment of the present invention may preferably be a resistor having a linear characteristics.

For example, even though a metal resistor has a small resistance value, a resistance value of the metal resistor is very linearly changed in response to a change in temperature and therefore may be suitable for the apparatus 100 for sensing temperature according to the embodiment of the present invention having the linear change in the resistance value. A temperature equation associated with the resistor of the temperature sensor unit 120 according to the embodiment of the present invention having the value linearly changed in response to the change in temperature is as follows.

$$R(T) = R_0 (1 + TC \cdot \Delta T) \quad \text{[Equation 1]}$$

In the above Equation 1, R(T) may represent the resistance value changed in response to the change in temperature, R0 may represent a basic resistance value which is a constant factor, T may represent a temperature change value, and TC may represent a temperature coefficient. TC is not changed in response to a process change but is preferably maintained at a constant value at all times. Therefore, the sensor resistor included in the apparatus 100 for sensing temperature according to the embodiment of the present invention may include characteristics having a linear function form in which the TC to temperature is set as a slope.

Meanwhile, FIG. 3 is an exemplified view of the sensor resistor according to the embodiment of the present invention.

As described above, the sensor resistor according to the embodiment of the present invention may be the metal resistor. However, the metal resistor may have an excessively low resistance value and therefore may have the same stacked structure as FIG. 3 so as to amplify the resistance value.

Referring to FIG. 3, the sensor resistor according to the embodiment of the present invention may include at least one metal resistor which is formed in a zigzag form. Further, the metal resistors having the same characteristics from a bottom layer have the stacked structure and thus a rectangular parallelepiped metal resistor having a large value may be formed.

Meanwhile, the sensor resistor according to the embodiment of the present invention may include a poly resistor or a well resistor. However, these resistors basically have slightly deteriorating linear characteristics but a large resistance value, and therefore may manufacture the temperature sensor having a very small area.

Figure 4:
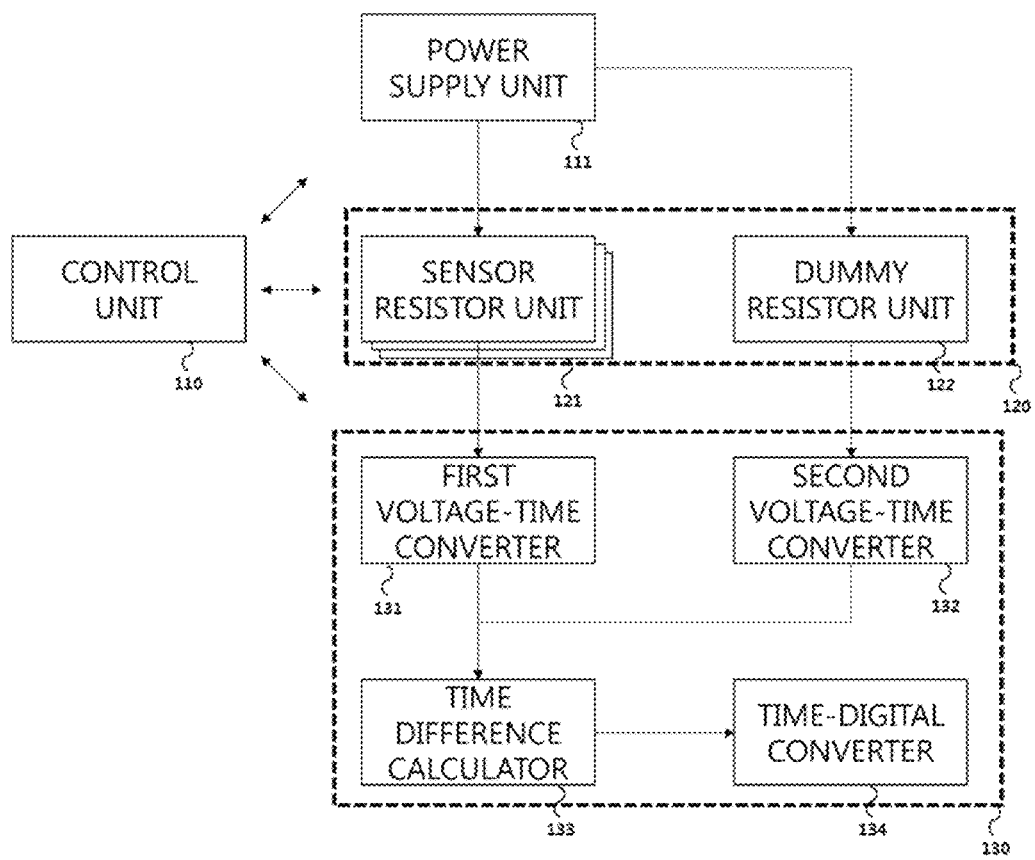
FIG. 4 is a view schematically depicting in detail the apparatus for sensing temperature according to the embodiment of the present invention.
Figure 5:
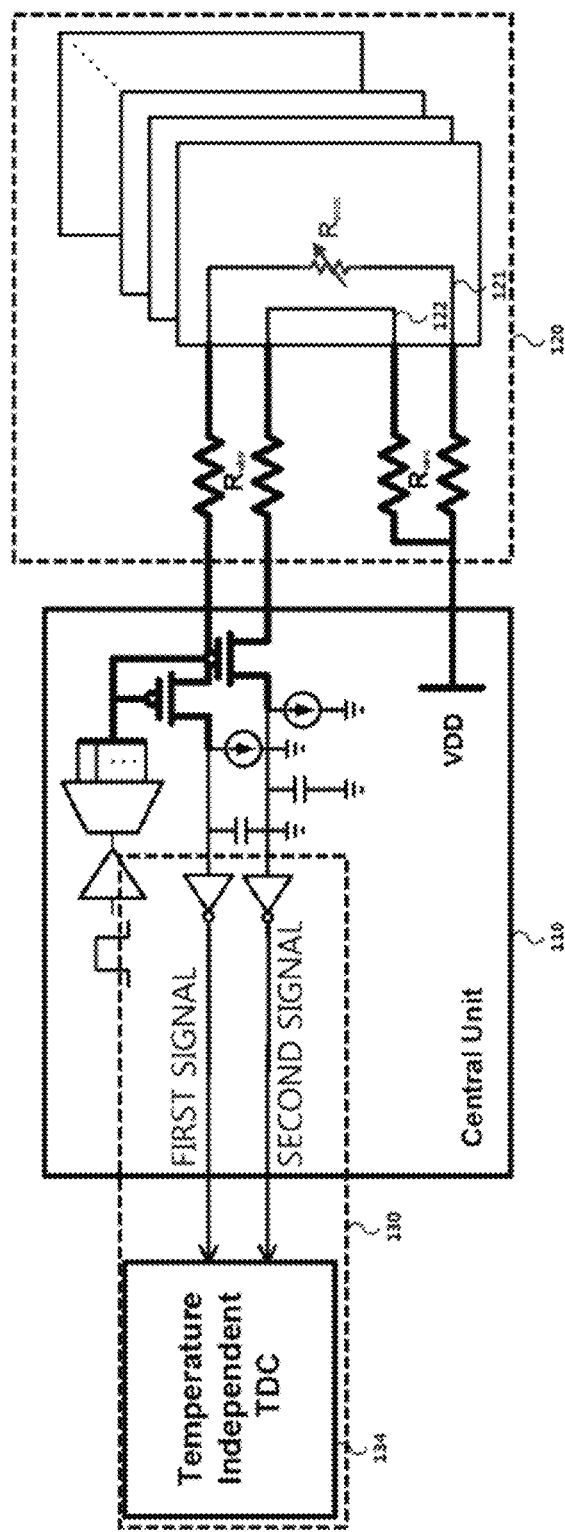
FIG. 5 is an exemplified circuit diagram implementing the apparatus for sensing temperature according to the embodiment of the present invention.

FIG. 4 is a view for describing in more detail the apparatus 100 for sensing temperature according to the embodiment of the present invention and FIG. 5 is an exemplified circuit diagram implementing the apparatus for sensing temperature according to the embodiment of the present invention.

As depicted in FIG. 4, the apparatus 100 for sensing temperature according to the embodiment of the present invention may include the control unit 110, the temperature sensor unit 120, and the data conversion unit 130. In more detail, the control unit 110 may include a power supply unit 111, the temperature sensor unit 120 may include at least one sensor resistor unit 121 and dummy resistor unit 122, and the data conversion unit 130 may include the first voltage-time converter 131, the second voltage-time converter 132, and the time difference calculator 133.

The control unit 110 of the apparatus 100 for sensing temperature may be connected to the sensor resistor unit 121 of the temperature sensor unit 120, which are spread over the whole of the semiconductor chip, by a switch, and therefore the sensor resistor unit 121 may be connected to the control unit 110 without limiting the number.

The power supply unit 111 applies power for operating the temperature sensor unit 120 and the data conversion unit 130 depending on the control of the control unit 110. In particular, the power supply unit 111 may individually apply operation power for operating at least one sensor resistor unit 121 in response to the selection signal.

For example, one end of each sensor resistor unit 121 is connected to the power supply unit 111 which is controlled by the control unit 110 and the other end thereof may be connected to a PMOS type switch. Further, each switch may be operated in response to the selection signal by the control of the control unit 110. For example, when any one of the sensor resistor unit 121 is selected, a clock signal is applied only to one switch and the rest of the switches may be turned off.

For example, the clock signal is input to the switch of the selected circuit of each sensor resistor 121, and thus when the switch is turned on, the capacitor connected to the circuit is charged with charges as a current source Is and when the switch is turned off, the capacitor may discharge electric charges as the current source Is. However, when there is a sensor physically remote from the circuit of the control unit 110, a wire also has a resistance component and therefore the resistance component may also affect a final value.

Therefore, the temperature sensor unit 120 of the apparatus 100 for sensing temperature according to the embodiment of the present invention may further include the dummy resistor unit 122.

The dummy resistor 122 is independently driven from the sensor resistor unit 121 and thus may output the second signal in response to the selection signal applied to the sensor resistor.

In particular, the dummy resistor unit 122 may have a circuit connection structure in which only the sensor resistor is removed from the circuit connection structure. Therefore, the second signal output from the dummy resistor unit 122 may include the signal component formed by the linear resistance included in the dummy resistor unit 122. In response thereto, the signal sensed by the sensor resistor output from the sensor resistor unit 121 may be referred to as the first signal and the signal having the first voltage may be output by the discharging for a first time. On the other hand, in the case of the dummy resistor unit 122, the signal having the second voltage may be output for a second time.

Meanwhile, the data conversion unit 130 may generate the temperature information based on the difference between the first time information acquired from the first signal of the sensor resistor unit 121 and the second time information acquired from the second signal.

To this end, the data conversion unit may include the first voltage-time converter 131 for acquiring the first time information, the second voltage-time converter 132 for acquiring the second time information, and the time difference calculator 133 for calculating the time difference depending on then output form the first voltage-time converter and the output from the second voltage-time converter.

The final output is based on the following Equation.

$$T_0 = T_2 - T_1 = R_{SENS} C = R_0 C (1 + TC \cdot \Delta T)$$ [Equation 2]

The above Equation may be induced as follows. Referring to the circuit diagram depicted in FIG. 5, $V_1 = VDD - I_S(R_{SENS} + 2R_{WIRE})$ and, $V_2 = VDD - I_S(2R_{WIRE})$ and therefore if $Q_1 = CV_1, Q_2 = CV_2,$ since $T_1 = (1/I_S)Q_1 = \dfrac{VDD \cdot C}{I_S} - (R_{SENS} + 2R_{WIRE})C - T_{th}$ and, $T_2 = (1/I_S)Q_2 = \dfrac{VDD \cdot C}{I_S} - (2R_{WIRE})C - T_{th},$ T2−T1 is calculated, such that the above Equation 2 may be induced.

In more detail, the circuit diagram to which the above Equation is applied is depicted in FIGS. 5 to 8.

Figure 6:
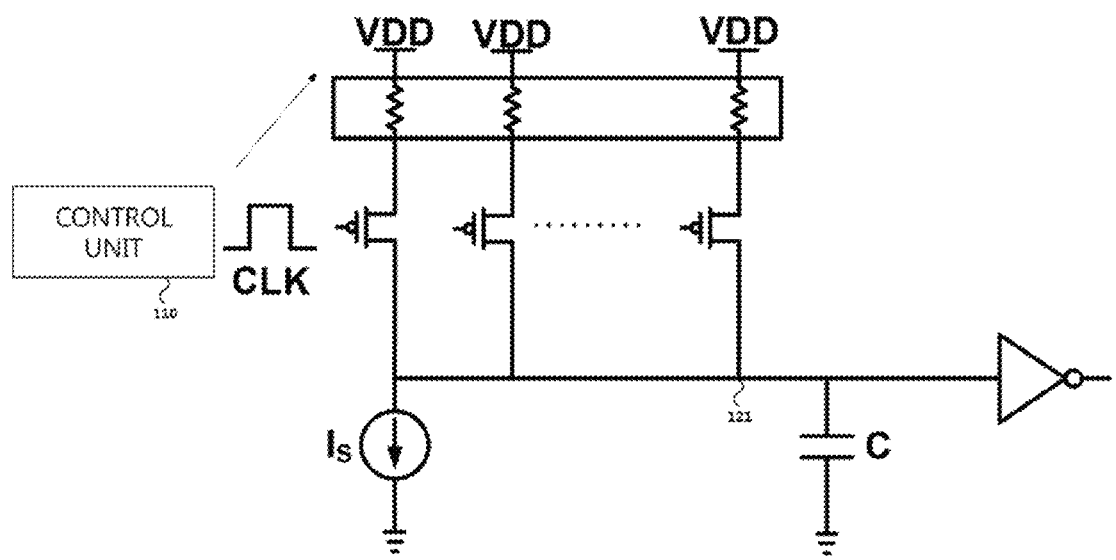
FIG. 6 is an exemplified circuit diagram implementing a control unit of the apparatus for sensing temperature according to the embodiment of the present invention.
Figure 7A:
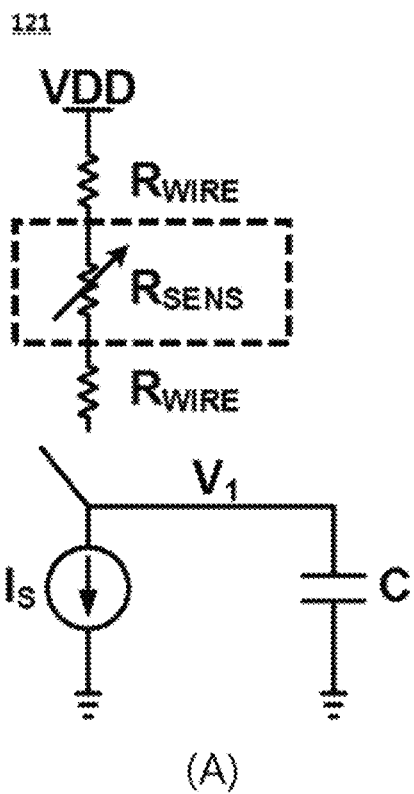
FIGS. 7A and 7B and 8 are views for comparison and description of a sensor resistor unit and a dummy resistor unit of the apparatus for sensing temperature according to the embodiment of the present invention.
Figure 7B:
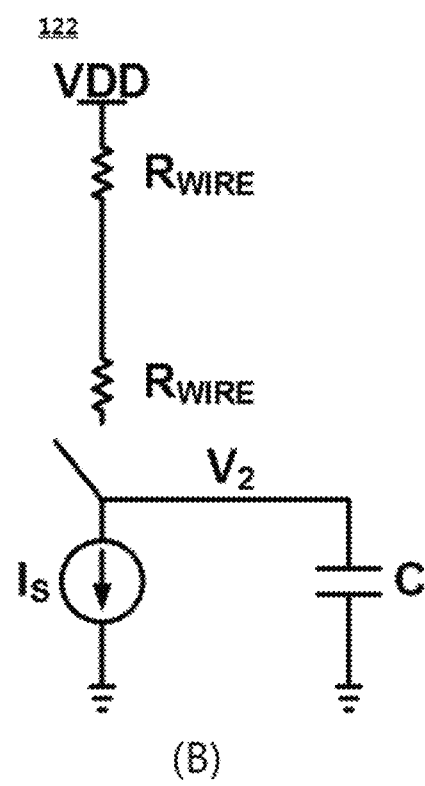

FIG. 6 is an exemplified circuit diagram implementing the control unit 110 of the apparatus for sensing temperature according to the embodiment of the present invention and FIGS. 7A and 7B and 8A and 8B are views for comparison and description of the sensor resistor unit 121 and the dummy resistor unit 122 of the apparatus for sensing temperature according to the embodiment of the present invention.

Figure 8:
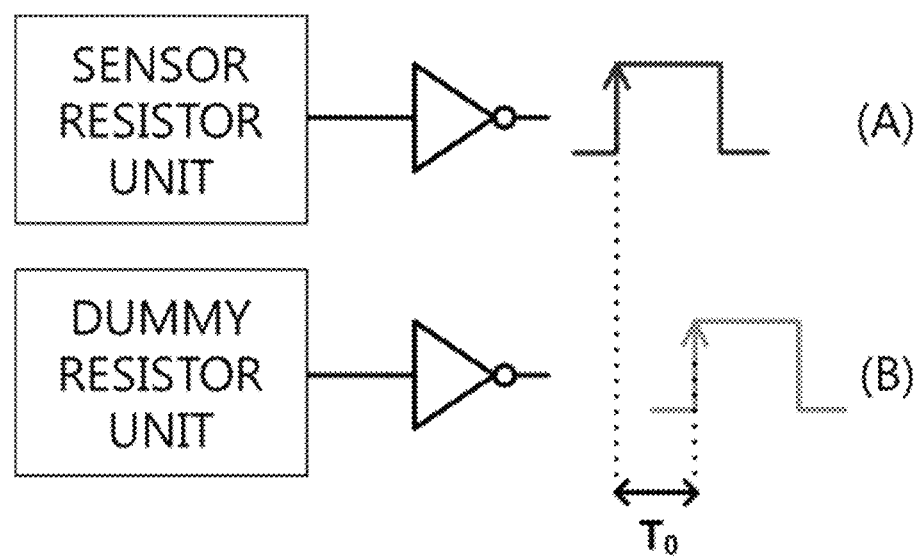

Referring to FIGS. 6 to 8, each of the sensor resistor unit 121 and the dummy resistor unit 122 may be connected to the first voltage-time converter 131 and the second voltage-time converter 132, in which the first voltage-time converter 131 may be connected to a line which is connected to the temperature sensor and the second voltage-time converter 132 may be connected to a dummy line without a sensor.

According to each circuit configuration, each of the first voltage-time converter 131 and the second voltage-time converter 132 may output a voltage waveform of FIG. 8(A) after the time as much as T1 from the time when the switch is turned off due to a clock and the discharging starts and output a voltage waveform of FIG. 8(B) after the time as much as T2.

Therefore, a size of the T1 and the T2 may be designated as the value disclosed in the above Equation 2. The time difference calculator 133 calculates the difference T0 between the two times to generate the time signal including the temperature information. In the above Equation 2, Tth represents a time corresponding to a threshold voltage of an inverter since a rising pulse is generated at the output from the inverter at the moment that the voltage stored in the capacitor is reduced and then falls below the threshold voltage of the inverter. In this case, the time difference calculator 133 may calculate the Tth to be excluded.

As such, the apparatus 100 for sensing temperature according to the embodiment of the present invention may exclude the output from the dummy resistor unit 122 from the output from the sensor resistor unit 121 to remove the resistance component of the metal wire connecting between the sensor and the circuit and remove all of several offset terms appearing during a process of inducing T1 and T2 like the above Equation 2. Therefore, even though VDD and Is are instable, the apparatus 100 for sensing temperature according to the embodiment of the present invention may generate the accurate time signal without being affected by the instable VDD and Is.

Meanwhile, the data conversion unit 130 may further include a time to digital converter (TDC). The TDC is not changed in response to temperature but may be constantly operated and may convert the time signal including the temperature information into a digital signal and output the converted digital signal.

The control unit 110 may determine the temperature value, to which the resistance characteristics in response to the change in temperature is reflected, based on the generated temperature information. To this end, the control unit 110 may store an output table corresponding to each sensor. Further, the control unit may further perform the calibration for creating the output table, which will be described in more detail with reference to FIGS. 10 and 11.

Figure 9:
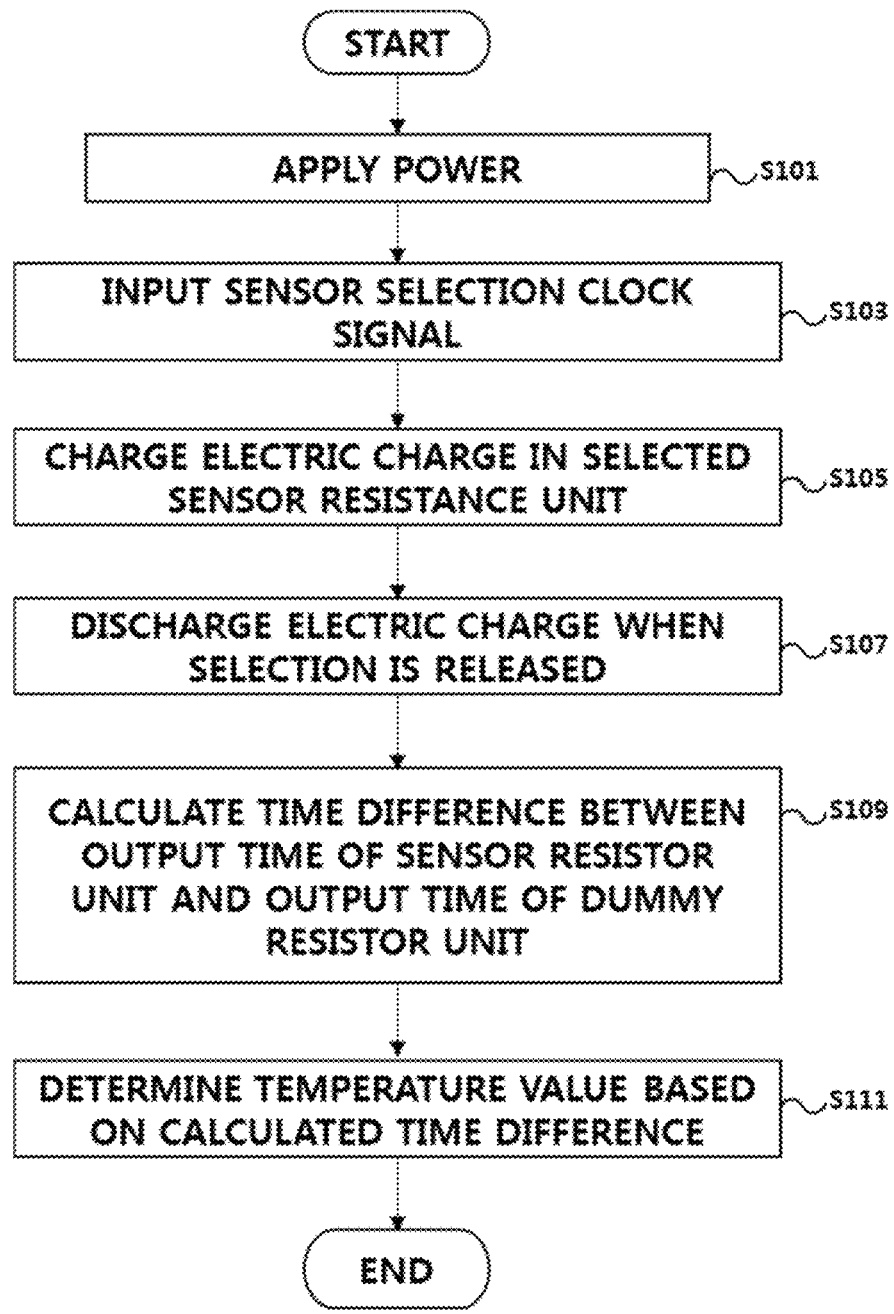
FIG. 9 is a flow chart for describing a method for sensing temperature according to an embodiment of the present invention.

FIG. 9 is a flow chart for describing a method for sensing temperature according to an embodiment of the present invention.

Referring to FIG. 9, in the apparatus 100 for sensing temperature according to the embodiment of the present invention, first, power is applied to the apparatus 100 for sensing temperature (S101).

The power supply unit 111 may apply the clock driving power, the applied voltage VDD, etc., for operating the apparatus 100 for sensing temperature to each component of the general apparatus 100 for sensing temperature by the control of the control unit 110.

Further, when being applied with power, the apparatus 100 for sensing temperature according to the embodiment of the present invention inputs the clock signal for the sensor selection (S103).

The control unit 110 may generate the clock signal for selecting the specific sensor resistor unit 120 and apply the generated clock signal to the switch of the sensor resistor unit 121 to be selected.

Further, the apparatus 100 for sensing temperature charges electric charges in the capacitor included in the selected sensor resistor unit 121 (S105).

A current supplied from the power supply unit 111 may be supplied to the capacitor included in the sensor resistor unit 121 by the switch which is controlled by the control unit 110.

Next, when the selection clock signal is released, the apparatus 100 for sensing temperature discharges the electric charges charged in the capacitor (S107).

As described above, when the application of power is blocked by the switch control by the release of the clock signal, the capacitor included in the sensor resistor unit 121 may be discharged at a constant speed by the operation of the current source Is which is connected in series. In this case, the dummy resistor unit 122 may perform the same charging and discharging operation at the same timing when power is applied to the sensor resistor unit 121. However, the change in voltage per hour of the dummy resistor unit 122 and the sensor resistor unit 121 may be different due to the characteristics of the sensor resistor itself included in the sensor resistor unit 121.

Therefore, the apparatus 100 for sensing temperature calculates a difference between the time when a value which is equal to or more than the threshold voltage of the sensor resistor unit 121 generated by the discharging is output and the time when a value which is equal to or more than the threshold voltage of the dummy resistor unit 122 is output (S109).

As described above, the sensor resistor included in the sensor resistor unit 121 may have linear characteristics having different coefficient values depending on the temperature characteristics. To extract the linear characteristics, as depicted in FIG. 8, the time difference calculator 133 may calculate the difference between the time when the value which is equal to or more than the threshold voltage of the sensor resistor unit 121 generated by the discharging is output and the time when a value which is equal to or more than the threshold voltage of the dummy resistor unit 122 is output and acquire a time voltage waveform called TO as the calculated result value.

Finally, the apparatus 100 for sensing temperature determines the temperature value based on the calculated time difference (S11) and outputs the determined temperature value to the outside.

First, the time-digital converter unit 134 of the data conversion unit 130 may acquire the digitally converted time value based on the time voltage waveform and transfer the acquired time value to the control unit 110. Further, the control unit 110 may acquire the temperature coefficient based on the digitally converted time value and may acquire the current temperature to be sensed based on the pre-stored output table and output the acquired current temperature to a micro system or the outside.

Meanwhile, to create the output table, the control unit 110 may perform the calibration process.

Figure 10:
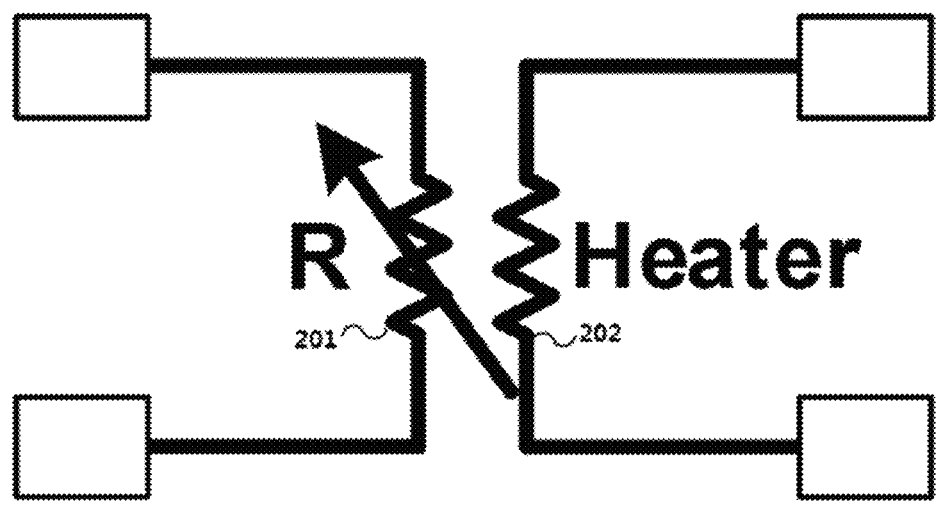
FIGS. 10 and 11 are views for describing a calibration method of an apparatus for sensing temperature according to another embodiment of the present invention.
Figure 11:
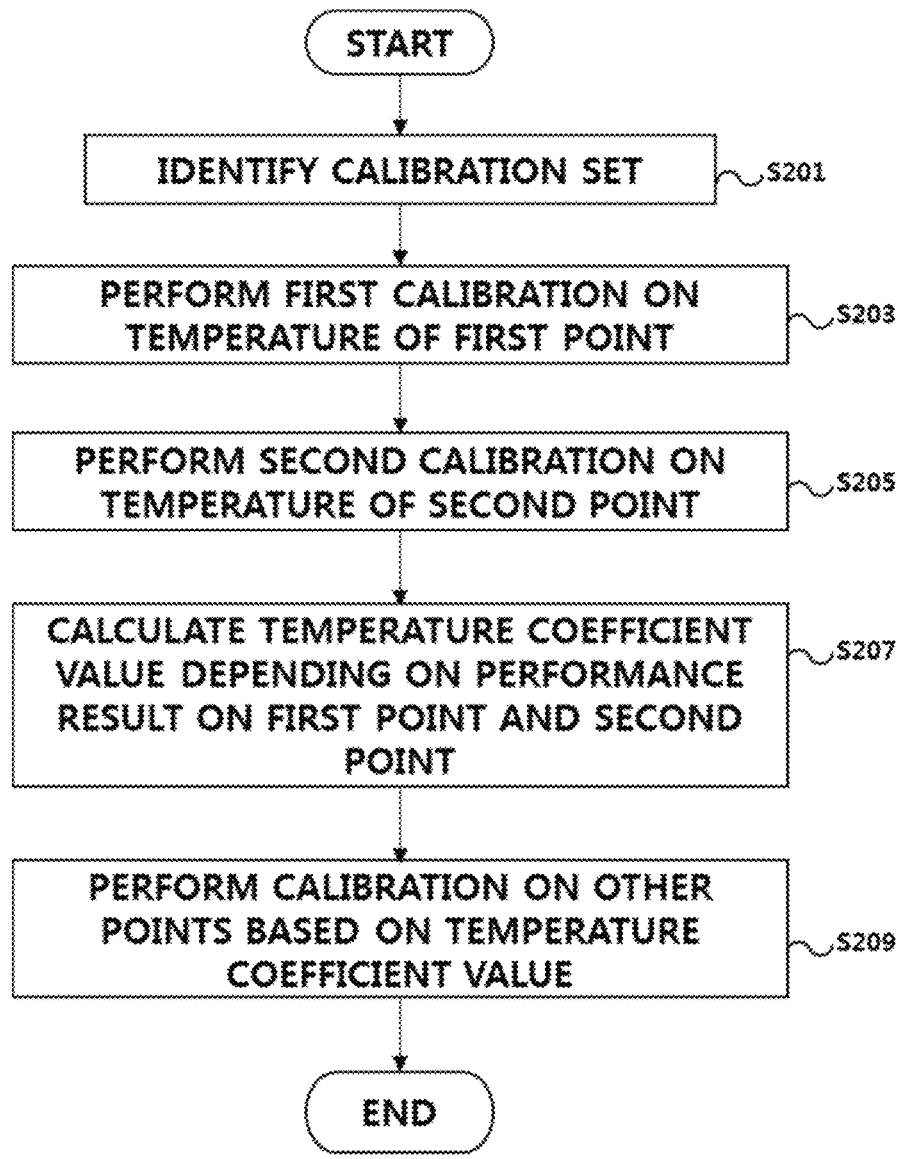

FIGS. 10 and 11 are views for describing a calibration method of an apparatus for sensing temperature according to another embodiment of the present invention.

In more detail, for the apparatus 100 for sensing temperature to serve as the temperature sensor by being implemented on an actual semiconductor ⊚, the output table which may determine the temperature value against the output from the actual apparatus 100 for sensing temperature may be required. However, generating all types of output tables for each sensor resistor may not be practical.

Therefore, the apparatus 100 for sensing temperature according to the embodiment of the present invention may provide a function of performing the calibration only at least two points to create the output table in advance.

To this end, the apparatus 100 for sensing temperature according to the embodiment of the present invention has a structure in which a first resistor (the same resistor as the resistor value and the kind of the sensor resistor) for calibration, not the sensor resistor and a second resistor different from the first resistor is formed at more than two positions of the chip on which the apparatus 100 for sensing temperature is installed.

The first resistor and the second resistor may be called one calibration set. The structure of the calibration set may be exemplified as depicted in FIG. 10. The calibration set may be connected to the control unit 110 of the apparatus 100 for sensing temperature, including a first resistor 201 and a second resistor 202.

It may be appreciated from the final output Equation of the above Equation 2, a final output of the resistor having the linear characteristics may be represented by a linear Equation for temperature. Therefore, all temperature values of other points may be estimated by knowing positions of at least two points, a position of one point, and figuring out the slope thereof.

Therefore, the control unit 110 according to the embodiment of the present invention may always estimate the linear coefficient based on the sensing of the output values for temperature of at least two points to complete the linear equation to complete the calibration without performing the calibration for other points.

For example, the apparatus 100 for sensing temperature according to the embodiment of the present invention performs the calibration according to the embodiment of the present invention as described above on at least two points at the timing when the semiconductor chip is first manufactured, thereby estimating a temperature coefficient (TC) value corresponding to the above Equation 2.

Further, the apparatus 100 for sensing temperature may apply the previously estimated TC value to all the sensor resistors which are positioned at other points. Therefore, when the apparatus 100 for sensing temperature is operated as the actual sensor, the calibration is performed only on the temperature of one point to create the output table having the temperature value corresponding to the outputs for each sensor resistor. Therefore, the control unit 110 may previously store the generated output table in a storage space like a separate memory, etc.

As a result, the apparatus 100 for sensing temperature according to the embodiment of the present invention may derive a result of effectively reducing the calibration frequency.

FIG. 11 is a flow chart for describing the method for sensing temperature according to the embodiment of the present invention.

Referring to FIG. 11, the apparatus 100 for sensing temperature according to the embodiment of the present invention identifies the calibration set (S201), performs a first calibration on a temperature of a first point (S203), and a second calibration on a temperature of a second point (S205).

As described above, the control unit 110 may identify at least two calibration sets and perform the calibration based on the sensed results which are sensed from each calibration set.

The calibration set may include the first resistor 201 and the second resistor 202, in which the first resistor 210 may have the same value and kind as the sensor resistor of the sensor resistor 121 according to the embodiment of the present invention. Further, the second resistor 202 may include a resistor different from the sensor resistor and may serve as a heater which changes temperature in response to a voltage. For example, the first resistor 210 may be a resistor of a metal material and the second resistor 202 may be a resistor of a poly material.

Therefore, the control unit 110 may control the calibration sets for each identified point to perform the first calibration on the temperature of the first point and the second calibration of the temperature of the second point.

Next, the apparatus 100 for measuring temperature calculates the temperature coefficient value based on the results obtained by performing the calibration on the first point and the second point (S207).

Like the above Equation 2, when the calibration is performed on two points, the temperature coefficient value TC may be calculated as temperature variables for each sensor resistor. This may be performed under the control of the control unit 110.

Further, the apparatus 100 for sensing temperature uses the temperature coefficient value to perform the calibration on another point.

As described above, the control unit 110 may perform the calibration on the sensor resistors of the actual sensor resistor unit 121 of other points when the temperature coefficient value TC previously calculated based on the above Equation 2 is present. Therefore, the control unit 110 may create the output table against the temperature of each sensor resistor 121 and may store the created output table in a separate storage space in advance.

To this end, the control unit 110 may be connected to a separate storage unit, etc., in which the storage unit may store, for example, programs for the operation of the control unit 110 and temporarily store the input/output data. The storage unit may include a storage medium of at least one of a flash memory type, a hard disk type, a multimedia card micro type, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

Meanwhile, the control method of the electronic apparatus according to various embodiments of the present invention are implemented in the form of program codes, which may be provided to each server or device in a state where such program devices are stored in various non-transitory computer readable medium.

The non-transitory computer readable medium is not a medium, for example, a register, a cash, a memory, etc., which is designed to store for short time period, but a medium which can store data semi-permanently and can be read by a device. In detail, the above various applications or programs may be stored in the non-transitory readable medium, for example, CD, DVD, a hard disk, a blue ray disk, USB, a memory card, ROM, etc.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. An apparatus for sensing temperature, comprising:
a sensor unit configured to include at least one linear sensor resistor and output a sensing signal varying by the sensor resistor in response to temperature when the sensor unit is applied with an operating voltage;
a data conversion unit configured to convert a change in temperature sensed based on the sensing signal output from the sensor unit into a time signal and generate temperature information based on the converted time signal; and
a control unit configured to control the sensor unit and the data conversion unit and output a temperature value determined depending on the temperature information
wherein the sensor unit includes:
a sensor resistor unit configured to include the sensor resistor and output a first signal in response to a selection signal applied to the sensor resistor; and
a dummy resistor unit configured to output a second signal in response to the selection signal applied to the sensor resistor, separately from the sensor resistor,
wherein the dummy resistor unit has a circuit connection structure in which only the sensor resistor is removed from a circuit connection structure of the sensor resistor unit;
wherein the data conversion unit includes:
a first voltage-time converter configured to acquire first time information when a value which is equal to or more than a threshold voltage of the sensor resistor unit is output;
a second voltage-time converter configured to acquire second time information when a value which is equal to or more than a threshold voltage of the dummy resistor unit is output;
a time difference calculator configured to calculate a time difference based on an output from the first voltage-time converter and an output from the second voltage-time converter; and
a time to digital converter (TDC) which is not changed in response to temperature but has a configuration to be constantly operated and converts a time signal corresponding to the time difference including the temperature information into a digital signal and outputs the converted digital signal.

2. The apparatus of claim 1, wherein the second signal output from the dummy resistor unit includes a signal component formed by a linear resistor included in the dummy resistor unit.

3. The apparatus of claim 1, wherein the data conversion unit generates the temperature information based on a difference between first time information acquired from the first signal and second time information acquired from the second signal.

4. The apparatus of claim 1, wherein the control unit calibrates a temperature information table for determining the temperature value, corresponding to the output from the data conversion unit and stores the calibrated temperature information table in advance.

5. The apparatus of claim 1, wherein the sensor unit charges electric charges in a first capacitor connected to the sensor resistor when the sensor unit is applied with a selection voltage of the control unit and
outputs a first voltage for the first time which is from timing when the selection signal is released to timing when the selection signal is maintained at a predetermined voltage or more while electric charges are discharged from the first capacitor.

6. The apparatus of claim 5, wherein the sensor unit charges electric charges in a second capacitor which is not connected to the sensor resistor when the sensor unit is applied with the selection voltage of the control unit, and outputs a second voltage for the second time which is from the timing when the selection signal is released to timing when the selection signal is maintained at a predetermined voltage or more while electric charges are discharged from the second capacitor.

7. A method for sensing temperature, comprising:

outputting, a sensing signal variably sensed by at least one linear sensor resistor in response to temperature from the sensor resistor, when the sensor resistor is applied with an operating voltage;

converting a change in temperature sensed based on the sensing signal into a time signal and generating temperature information based on the time signal; and outputting a temperature value determined depending on the temperature information wherein the outputting, the sensing signal comprising:

outputting a first signal in response to a selection signal applied to a sensor resistor, by a sensor resistor unit configured to include the sensor resistor; and outputting a second signal in response to the selection signal applied to the sensor resistor, separately from the sensor resistor, by a dummy resistor unit, wherein the dummy resistor unit has a circuit connection structure in which only the sensor resistor is removed from a circuit connection structure of the sensor resistor unit;

wherein the converting comprising:

acquiring, by a first voltage-time converter, first time information when a value which is equal to or more than a threshold voltage of the sensor resistor unit is output;

acquiring, by a second voltage-time converter, second time information when a value which is equal to or more than a threshold voltage of the dummy resistor unit is output;

calculating a time difference based on an output form the first voltage-time converter and an output from the second voltage-time converter;

converting the time signal corresponding to the time difference including the temperature information into a digital signal, by a time to digital converter (TDC) which is not changed in response to temperature but may be constantly operated; and outputting the converted digital signal.

8. The method of claim 7, wherein the second signal includes a signal component formed by a linear resistor included in a dummy resistor unit.

9. The method of claim 7, further comprising:

calibrating a temperature information table for determining the temperature value, corresponding to the temperature information and storing the calibrated temperature information in advance.

10. The method of claim 7, wherein the outputting of the sensing signal includes:

charging charges in a first capacitor connected to the sensor resistor when a selection signal for selecting the sensor resistor is applied to the sensor resistor; and outputting a first voltage for the first time which is from timing when the selection signal is released to timing when the selection signal is maintained at a predetermined voltage or more while electric charges are discharged from the first capacitor.

11. The method of claim 10, wherein the outputting of the sensing signal includes:

charging charges in a second capacitor not connected to the sensor resistor when the selection signal is applied to the sensor resistor; and outputting a second voltage for the second time which is from timing when the selection signal is released to timing when the selection signal is maintained at a predetermined voltage or more while electric charges are discharged from the second capacitor.

12. The method of claim 11, wherein the generating of the temperature information includes generating the temperature information based on a difference between an output time of the first voltage and an output time of the second voltage.

13. A non-transitory computer readable recording medium recorded with programs for allowing a computer to execute the method of claim 7.

* * * * *